May 28, 1957     N. O. WHITE     2,793,709
FILTER
Filed March 18, 1955
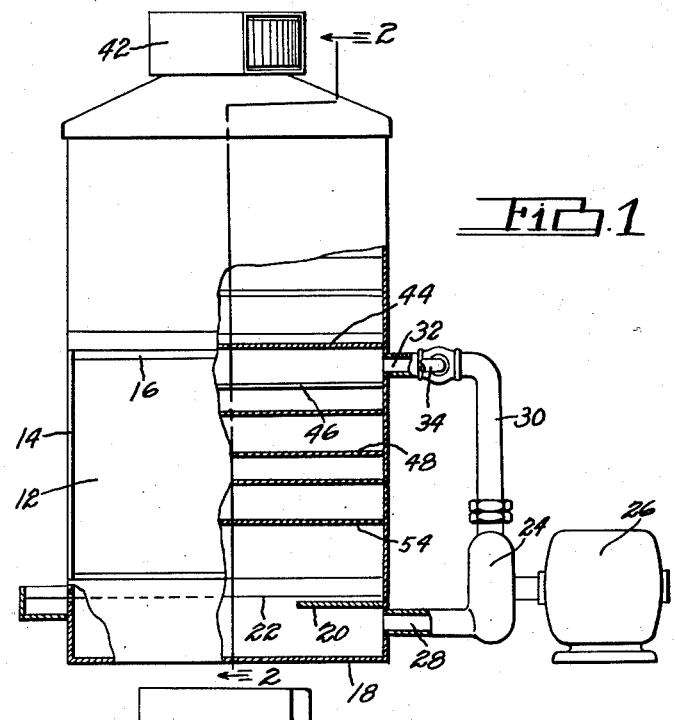
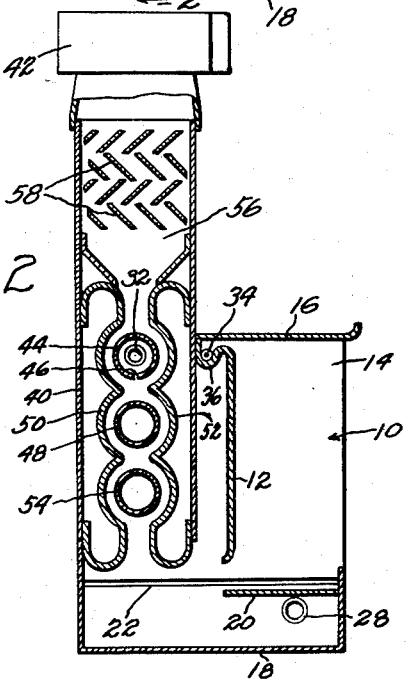
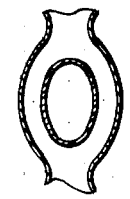
INVENTOR.
NORMAN O. WHITE
BY
*LaRue W. Patee*
HIS ATTORNEY

United States Patent Office 2,793,709
Patented May 28, 1957

2,793,709

FILTER

Norman O. White, Oak Park, Mich., assignor to Now Industries Inc., Detroit, Mich., a corporation of Michigan Application March 18, 1955, Serial No. 495,319

2 Claims. (Cl. 183—26)

This invention relates to a filter for removing dirt, fumes, small globules of paint and foreign matter from the air, and more particularly to a filter adapted for use with a spray booth.

In the conventional spray booth, articles to be painted are placed in a hooded booth and the articles are painted by spraying. A water curtain forms a background for the spray, collecting most of the excess paint which does not strike the articles, but leaves paint vapor in the air inside the booth. This water curtain is collected in a water bath and the paint floats on the surface of the bath where it is removed, reclaimed, and used again. The water curtain is formed by a pump drawing water from the bath and discharging it at the upper edge of the curtain.

It is an object of the present invention to not only reclaim the excess paint, but to remove the dust, dirt and fumes from the air in the hood by filtering the air through a waterfall in the path of a forced air stream caused to be drawn from the spray booth.

Another object of the invention is to use the water from the bath for forming the waterfall and to utilize the same water pressure produced by the pump which supplies the pressure to the water curtain.

A further object of the invention is to provide a tortuous path for the waterfall, and to draw an air current through the waterfall in a direction opposite to the flow of water.

Other objects and advantages of the invention will more fully appear from the following description taken in connection with the accompanying drawings, in which:

Fig. 1 is a front elevational view of the improved filter, a portion thereof being broken away and in section;

Fig. 2 is a cross sectional view taken on line 2—2 of Fig. 1;

Fig. 3 is a fragmentary sectional view showing a modified form of a tubular member; and Fig. 4 is a view corresponding to Fig. 3 but showing a further modification of a tube.

Referring to an illustrated embodiment of the invention, wherein the improved filter has been applied to a spray booth, I have shown a hood 10, open at the front, wherein articles are sprayed. The hood has a back wall 12, side walls 14 and top 16. The bottom opens into a tank 18 containing a water bath. A baffle plate 20, below the hood 10 and slightly below the water level, shown by the line 22, is provided in the tank.

A pump 24, driven by a motor 26, has an inlet conduit 28 and an outlet conduit 30. The inlet conduit 28 is connected to the tank 18 at a point below the baffle for drawing water from the water bath. The outlet conduit 30 is branched, having two outlet conduits 32 and 34. The one conduit 32 leads to the improved filter, hereinafter more fully described, and the other conduit 34 leads to a transversely extending trough 36 at the upper edge of the back wall 12. The pump 24 draws the water from the tank 18 and delivers it to the trough 36 where it spills over the upper edge of the back wall 12 forming a water curtain which is drained back into the tank 18. This water curtain carries off some of the excess paint when the articles are being sprayed but it will be understood that the air in the hood is filled with fumes and fine globules of paint which are not collected by the waterfall. With this in mind, it is the purpose of my improved filter to remove such particles in the air. Also, it is to be understood that the filter, while shown in connection with a spray booth, may be used for many other purposes wherein it is desired to remove foreign matter from the air.

The improved filter comprises a main chamber 40 open at its opposite ends. A blower 42 is provided at one end of the chamber 40 adapted to draw air through the chamber, and as herein illustrated the opposite end of the chamber is open to the hood 10 so that the air in the hood 10 is drawn through the chamber 40 by the blower 42.

The conduit 32 is connected to a transversely extending tube 44 which receives the water pressure supplied through the conduit 30. The wall of the tube 44 is provided with a slot 46 for draining the water evenly throughout the length of the tube to form a waterfall which is discharged back into the tank 18 through the open end of the chamber 40. Directly below the slot 46 and spaced therefrom is an obstruction to the waterfall, shown here as a transversely extending tube 48, which divides the water stream.

The air stream through the chamber 40 and around the tube 48 and tube 44 is restricted by irregularly shaped plates 50 and 52 spaced from the tubes and conforming generally to the shape of the outer periphery of the tubes, but spaced apart so as to provide an opening therebetween to permit water to flow downwardly from one tube to the other and to permit an air stream to flow upwardly on opposite sides of the tubes. The tubes 44, 48 and plates 50, 52 form a tortuous path for the flow of water in one direction and a flow of air in the opposite direction. The number of tubes may be varied. As herein illustrated, a third tube 54 has been provided and the plates 50 and 52 extended to partially surround the tube 54. The shape of the tubes may be circular, as shown in Fig. 2, diamond shaped, as shown in Fig. 3, or oval, as shown in Fig. 4, or any other desired shape.

The tube 44 is filled with water from the pressure line 32 and the water flows through the slot 46 striking the tube 48 where it is divided into two streams, one at each side of the tube. The water, by surface tension, follows the outer surface of the tube and flows off at the bottom center of tube 48 on to the tube 54 where the action is repeated. At the same time the blower 42 causes an air current to be drawn upwardly over the down flow of water. This causes a violent turbulence of the water in the tortuous paths, and some of the outer surface water is picked up by the air stream striking the plates 50 and 52 where, by surface tension and gravity, it flows downwardly along the inner surfaces of the plates 50 and 52, thus providing two more water surfaces for the upwardly flowing air velocity to strike, causing additional turbulence. It will be understood that when the device is in operation there are four thin surfaces of water over which the air passes to pick up a film of water. The tortuous air stream in passing over the waterfalls rather than through the water, picks up a mist rather than water globules and collects the globular particles of paint, escaping the water screen in the spray booth, as well as fumes, dust and foreign matter in the air. The plates 50 and 52 surrounding the tubes 44, 48 and 54 form a restricted passage for the air where its velocity is great, after which it is lowered in an expansion chamber 56.

To prevent the blower from drawing the water through the blower, a plurality of overlapping and diagonally arranged baffles 58 have been provided in the upper end of the expansion chamber 56 which divert the water back into the waterfalls.

While the invention has been illustrated and described in connection with a spray booth, it will be understood that the filter portion of the device may be used for other purposes, and that various changes, including the size, shape and arrangement of parts, such as shape and size of tubes or plates, may be made without departing from the spirit of my invention, and it is intended that all matter contained in the above description or shown in the accompanying drawings shall be interpreted as illustrative and not in a limiting sense.

I claim:

1. A filter comprising, a chamber open at its opposite ends, a blower at one end of said chamber for producing an air current through said chamber, a tubular member having its longitudinal axis arranged transversely within said chamber, said tubular member having an opening in the wall thereof, means for supplying water to said tube and through said opening, a plurality of vertically spaced and transversely extending tubes spaced from said first named tube arranged to intercept the water stream flowing through the opening in said first named tube, and plates conforming generally to the outer shape of said tubes spaced apart and spaced from the outer periphery of said tubes for directing the air stream in said chamber in a tortuous path around said tubes.

2. A filter comprising, a chamber open at its opposite ends, a blower at one end of said chamber for producing an air current through said chamber, a tubular member having its longitudinal axis arranged transversely within said chamber, said tubular member having an opening in the wall thereof, means for supplying water to said tube and through said opening, a second tube spaced from and beneath said first named tube arranged to intercept the water stream flowing through the opening in said first named tube, plates conforming generally to the outer shape of said tubes spaced apart and spaced from the outer periphery of said tubes for directing the air stream in said chamber in a tortuous path around said tubes, an expansion chamber at the discharge end of said chamber, and baffle plates in the expansion chamber of said chamber for collecting and discharging the water into said chamber.

References Cited in the file of this patent

UNITED STATES PATENTS

| | | |
|---|---|---|
| 943,422 | Knoepfel | Dec. 14, 1909 |
| 1,471,101 | Cleary | Oct. 16, 1923 |
| 2,227,465 | Roche et al. | Jan. 7, 1941 |
| 2,527,139 | Loney | Oct. 24, 1950 |
| 2,536,998 | Newcomb et al. | Jan. 2, 1951 |